United States Patent
Krishnamurthy et al.

(10) Patent No.: US 12,434,844 B2
(45) Date of Patent: Oct. 7, 2025

(54) SHAPE MEMORY POLYMER INTEGRATED CUSHION UPHOLSTERY USING ARTIFICIAL MUSCLES TECHNOLOGY

(71) Applicant: B/E Aerospace, Inc., Winston-Salem, NC (US)

(72) Inventors: Chirag Krishnamurthy, Karnataka (IN); Sourabh Vijaya Manae, Bengaluru (IN); Gururaja Nekkar, Bangalore (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 238 days.

(21) Appl. No.: 18/210,425

(22) Filed: Jun. 15, 2023

(65) Prior Publication Data
US 2024/0317404 A1 Sep. 26, 2024

(30) Foreign Application Priority Data
Mar. 21, 2023 (IN) .............................. 202311018942

(51) Int. Cl.
*F03G 7/06* (2006.01)
*B60N 2/58* (2006.01)
(Continued)

(52) U.S. Cl.
CPC ............ *B64D 11/0647* (2014.12); *B60N 2/60* (2013.01); *B60N 2/6081* (2013.01); *F03G 7/0121* (2021.08)

(58) Field of Classification Search
CPC ........ D02G 3/44; D03D 15/50; D03D 15/533; Y10T 442/636–638; Y10T 442/64;
(Continued)

(56) References Cited

U.S. PATENT DOCUMENTS 9,527,421 B2 * 12/2016 Hulway .................. B60N 2/99
10,246,193 B1 4/2019 Finlay
(Continued)

FOREIGN PATENT DOCUMENTS

WO 2017165435 A2 9/2017
WO 2018075206 A1 4/2018

OTHER PUBLICATIONS

Materials for Biomedical Engineering: Nanobiomaterials in Tissue Engineering. Chapter 3: Novel twisted and coiled polymer artificial muscles for biomedical and robotics applications, Lokesh Saharan, et al., Mar. 15, 2019.
(Continued)

*Primary Examiner* — Rodney B White
(74) *Attorney, Agent, or Firm* — Suiter Swantz, IP

(57) ABSTRACT

An upholstery is described. The upholstery includes a dress cover which covers a cushion. Artificial muscles are incorporated into the dress cover. The artificial muscles improve the pressure distribution between a passenger and the cushion. The artificial muscles are yarns which change length in response to receiving a voltage differential. The change in length of the yarns causes the dress cover to bulge. The bulge of the dress cover then allows the cushion to expand thereby changing the stiffness of the cushion. The voltage differential across the yarns is adjusted to accommodate passengers with a range of weights. The upholstery is applied across an aircraft cabin in seat pans, seat backs, head rests, and leg rests.

20 Claims, 17 Drawing Sheets

(51) Int. Cl.
  *B60N 2/60* (2006.01)
  *B64D 11/06* (2006.01)
  *F03G 7/00* (2006.01)

(58) Field of Classification Search
  CPC . Y10T 442/641; Y10T 442/3146; B60N 2/60;
  B60N 2/6081
  USPC .......................... 428/362, 369, 371; 442/301
  See application file for complete search history.

(56) References Cited

U.S. PATENT DOCUMENTS

| | | | |
|---|---|---|---|
| 10,480,104 B2 * | 11/2019 | Fu | .......................... D02G 3/441 |
| 10,557,220 B2 * | 2/2020 | Fu | ........................ A61B 5/6807 |
| 10,611,278 B2 | 4/2020 | Pardue et al. | |
| 10,736,435 B2 | 8/2020 | Duncan et al. | |
| 10,913,535 B2 | 2/2021 | Udriste et al. | |
| 11,319,075 B1 | 5/2022 | Malecha et al. | |
| 11,344,461 B2 * | 5/2022 | Rowe | .................. A47C 31/008 |
| 11,396,377 B1 | 7/2022 | Zurian | |
| 11,447,896 B2 * | 9/2022 | Fu | .......................... D02G 3/441 |
| 11,649,004 B2 * | 5/2023 | Palaniswamy | ........... B62J 1/007 |
| | | | 297/195.1 |
| 11,891,730 B2 * | 2/2024 | Fu | ............................ D02G 3/44 |
| 12,006,074 B2 * | 6/2024 | Manyapu | ................. B03C 3/017 |
| 2008/0157583 A1 | 7/2008 | Boren et al. | |
| 2009/0081409 A1 * | 3/2009 | Salzmann | ................. D04B 1/16 |
| | | | 428/113 |
| 2014/0015290 A1 | 1/2014 | Saada et al. | |
| 2014/0015293 A1 * | 1/2014 | Pellenz | .................. A61H 23/04 |
| | | | 297/217.3 |
| 2017/0320579 A1 | 11/2017 | Velasco | |
| 2018/0195213 A1 | 7/2018 | Tibbits et al. | |
| 2019/0085489 A1 | 3/2019 | Taniguchi et al. | |
| 2019/0375321 A1 * | 12/2019 | Yano | ........................ B60N 2/20 |
| 2020/0031259 A1 | 1/2020 | Hoppe et al. | |
| 2020/0070702 A1 | 3/2020 | Sankrithi et al. | |
| 2020/0231285 A1 | 7/2020 | Udriste et al. | |
| 2020/0346757 A1 | 11/2020 | Ballocchi et al. | |
| 2021/0198817 A1 | 7/2021 | Göktepe et al. | |
| 2022/0297288 A1 | 9/2022 | Li et al. | |
| 2022/0355717 A1 | 11/2022 | Mandelbaum et al. | |

OTHER PUBLICATIONS

Pederson, Darrell M.; Advisory Circular entitled "Flammability Requirements for Aircraft Seat Cushions" ANM-110; 25.853-1, Sep. 17, 1986.
European Search Report dated Mar. 22, 2024; European Application No. 23220404.0.

* cited by examiner

SHAPE MEMORY POLYMER INTEGRATED CUSHION UPHOLSTERY USING ARTIFICIAL MUSCLES TECHNOLOGY

CROSS-REFERENCE TO RELATED APPLICATIONS

The present application claims the benefit of India Provisional Patent Application No. 20/2311018942, filed on Mar. 21, 2023, titled "SHAPE MEMORY POLYMER INTEGRATED CUSHION UPHOLSTERY USING ARTIFICIAL MUSCLES TECHNOLOGY", naming Chirag Krishnamurthy et al. as inventors, with a Digital Access Service (DAS) code of 3C0B, which is incorporated herein by reference in the entirety.

TECHNICAL FIELD

The present invention generally relates to seating and more specifically to support structures for the cushions of the seats.

BACKGROUND

Passenger seats may include one or more cushions. The cushions are predominantly manufactured using polyurethane (PU) foams. The cushions include a stiffness which is set during manufacturing. The stiffness may be designed to comfortably accommodate passenger in a given weight range. Passengers outside of the weight range may experience discomfort due to the cushion providing too much or too little support. The cushions do not actively conform to different sized occupants. Therefore, it would be advantageous to provide a device, system, and method that cures the shortcomings described above.

SUMMARY

An upholstery is described, in accordance with one or more embodiments of the present disclosure. In some embodiments, the upholstery includes a cushion. In some embodiments, the upholstery includes a dress cover. In some embodiments, the dress cover encloses at least a portion of the cushion. In some embodiments, the dress cover comprises a first yarn and a second yarn. In some embodiments, the first yarn and the second yarn are woven together. In some embodiments, the first yarn is in warp. In some embodiments, the second yarn is in weft. In some embodiments, the dress cover compresses the cushion when there is no voltage applied across the first yarn and the second yarn. In some embodiments, the first yarn and the second yarn are each configured to change in length upon receiving a voltage differential. In some embodiments, the change in length of the first yarn and the second yarn causes the dress cover to bulge. In some embodiments, the bulge of the dress cover allows the cushion to expand thereby changing a stiffness of the cushion. In some embodiments, the first yarn and the second yarn are each configured to return to an original length when the voltage differential is removed.

A passenger seat is described, in accordance with one or more embodiments of the present disclosure. In some embodiments, the passenger seat includes a seat back. In some embodiments, the passenger seat includes a seat pan. In some embodiments, the passenger seat includes an upholstery. In some embodiments, the upholstery includes a cushion. In some embodiments, the upholstery includes a dress cover. In some embodiments, the dress cover encloses at least a portion of the cushion. In some embodiments, the dress cover comprises a first yarn and a second yarn. In some embodiments, the first yarn and the second yarn are woven together. In some embodiments, the first yarn is in warp. In some embodiments, the second yarn is in weft. In some embodiments, the dress cover compresses the cushion when there is no voltage applied across the first yarn and the second yarn. In some embodiments, the first yarn and the second yarn are each configured to change in length upon receiving a voltage differential. In some embodiments, the change in length of the first yarn and the second yarn causes the dress cover to bulge. In some embodiments, the bulge of the dress cover allows the cushion to expand thereby changing a stiffness of the cushion. In some embodiments, the first yarn and the second yarn are each configured to return to an original length when the voltage differential is removed.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
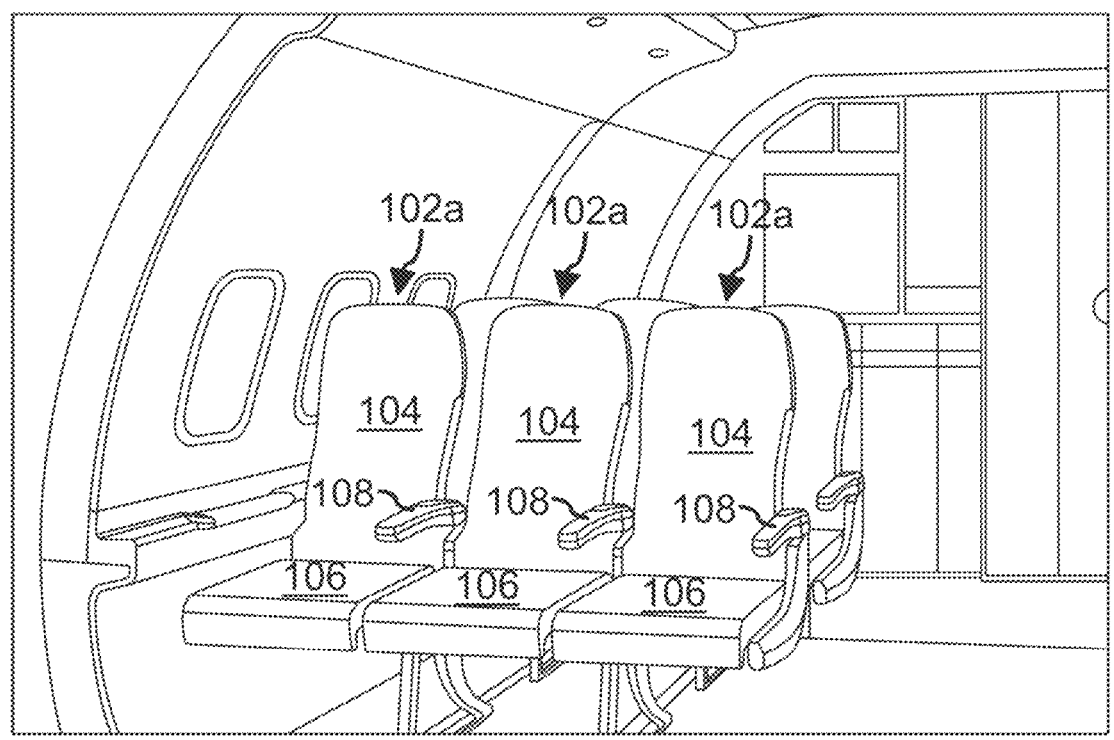
FIGS. 1A-1C depict a perspective view of an aircraft including passenger seats, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

U.S. Pat. No. 11,319,075, titled "Compressible cushion for an aircraft seat", filed on Mar. 10, 2021; and U.S. Pat. No. 11,396,377, titled "Aircraft seatback cover attachment system", filed on May 5, 2021; are each incorporated herein by reference in the entirety.

Reference will now be made in detail to the subject matter disclosed, which is illustrated in the accompanying drawings. Embodiments of the present disclosure are generally directed to upholsteries with dress covers made of artificial muscles. The seat dress covers made of the artificial muscles conform to the human body contour of a passenger sitting on the seat. The displacement and force of the dress cover is determined by a voltage applied to the artificial muscles, the fabric, material properties and sizes, and the manner of patterning and assembly of the artificial muscles. The dress cover retains a potential deflection state offering counter pressure to passenger for a prolonged time until the voltage is supplied. The dress cover dynamically adjusts shape and contour as the passenger changes a seated position. The active shape morphing of the dress cover eases the blood flow and provides better comfort. The dress cover conforms to the body to increase the surface area between the body and the seat. Increasing the surface area may reduce the pressure distribution of the body on the seat.

Figure 1B:
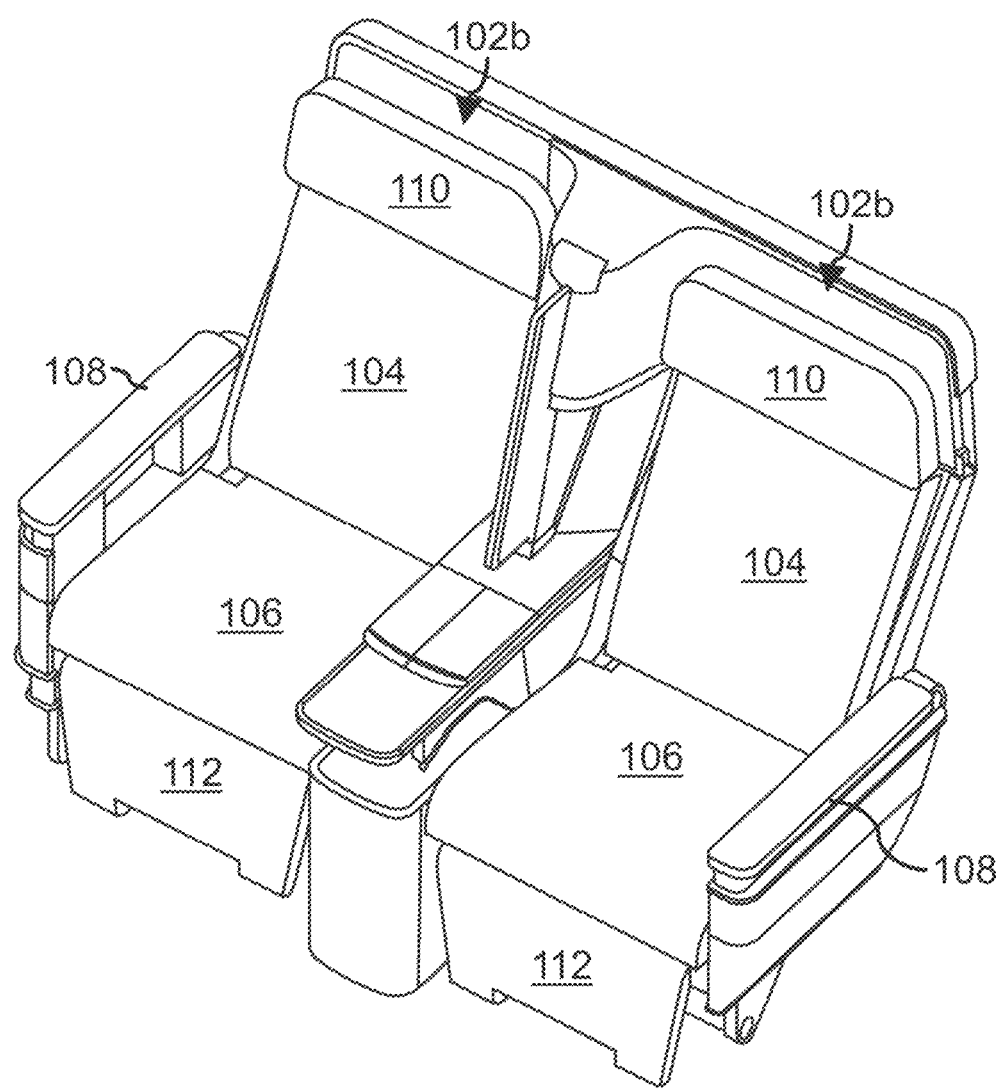
Figure 1C:
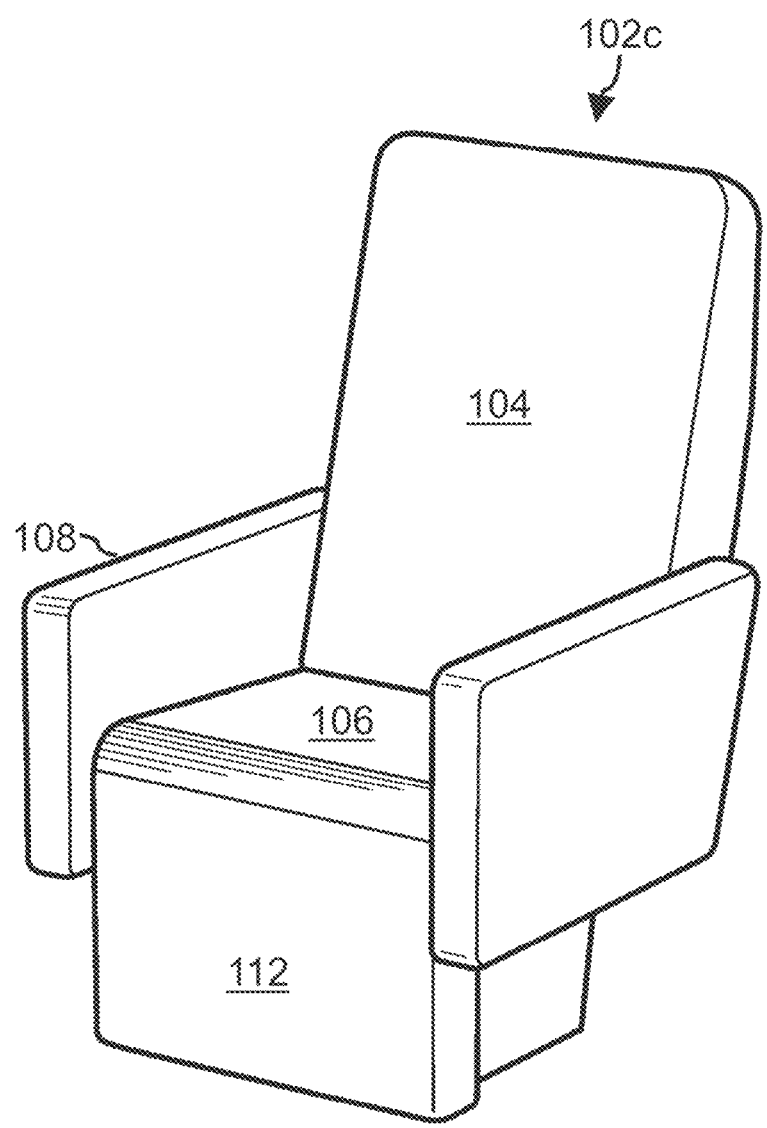

Referring now to FIGS. 1A-1C, an aircraft 100 that includes a passenger seat 102 is described, in accordance with one or more embodiments of the present disclosure. For example, the passenger seat 102 may include, but is not limited to, an economy-class passenger seat, a business class passenger seat, a first-class passenger seat, a cabin attendant passenger seat, and the like. FIG. 1A depicts an example of a passenger seat 102*a*. FIG. 1B depicts an example of a passenger seat 102*b*. FIG. 1C depicts an example of a passenger seat 102*c*. The passenger seats 102*a*-102*c* are merely illustrative of the various embodiments of the present disclosure and are not intended to be limiting.

The passenger seat 102 may include a seat back 104 and a seat pan 106. The passenger seat 102 is coupled to a floor (e.g., by a track) for providing structural support to the seat pan 106 and the seat back 104. In embodiments, the seat back 104 and the seat pan 106 may be separate structures and/or may include one or more shared components. For example, the seat back 104 and the seat pan 106 can have a shared cushion or covering. The seat back 104 may also be configured to move relative to the seat pan 106. For example, the seat back 104 can be configured to transition between upright and reclining positions. In embodiments, the seat pan 106 can also be actuated such that the passenger seat 102 may be configurable between an upright position and a bed position (i.e., a lie-flat position), although this is not intended to be a limitation of the present disclosure. The passenger seat 102 may also include one or more arm rests 108. The arm rests 108 may be pivotally mounted to the passenger seat 102 by a pivot joint or another kinematic coupling. In embodiments, the passenger seat 102 may include a head rest 110. The head rest 110 may be coupled to the seat back 104. In embodiments, the passenger seat 102 may include a foot rest 112. The foot rest 112 may be coupled to the seat pan 106. In embodiments, the passenger seat 102 may include an upholstery 200.

Figure 2A:
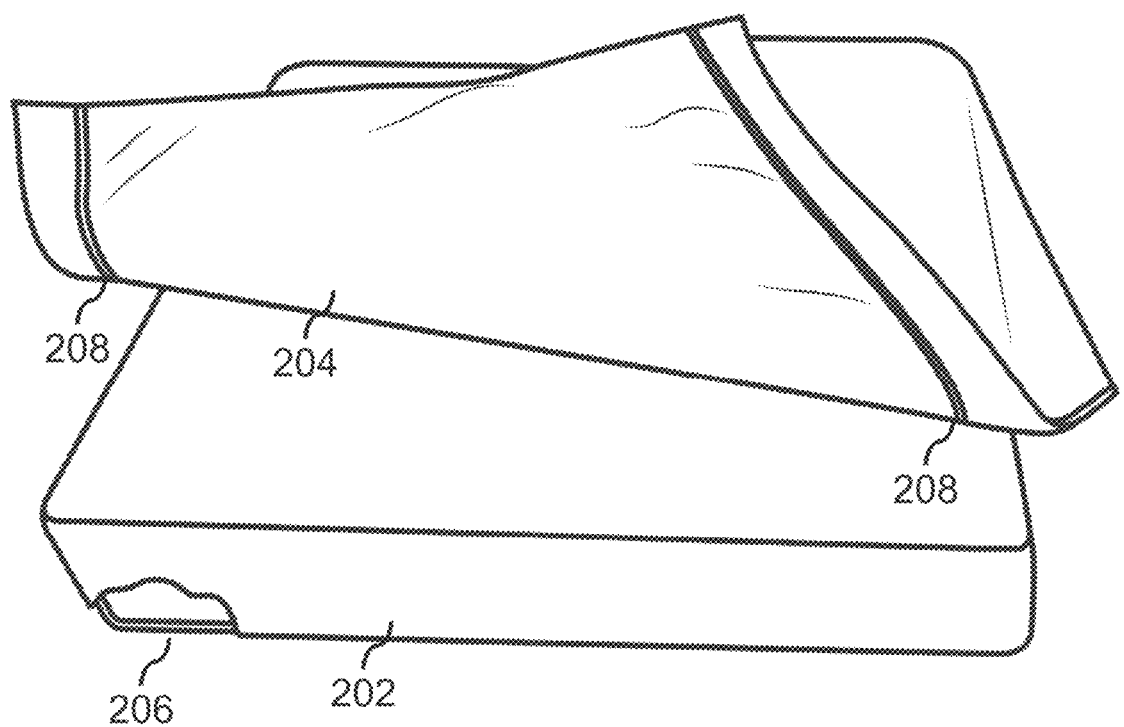
FIG. 2A depicts a perspective view of an upholstery with a dress cover, in accordance with one or more embodiments of the present disclosure.
Figure 2B:
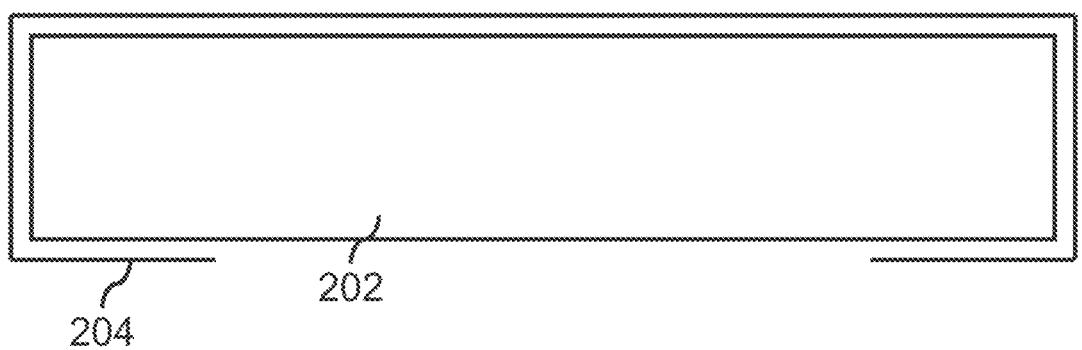
FIG. 2B depicts a side view of an upholstery with a dress cover, in accordance with one or more embodiments of the present disclosure.

Referring now to FIGS. 2A-2B, an upholstery 200 is described, in accordance with one or more embodiments of the present disclosure. The upholstery 200 may include a cushion 202, a dress cover 204, a base structure 206, and the like. The upholstery 200 may be considered an artificial muscle upholstery due to the yarns of the dress cover 204, as will be described further herein.

In embodiments, the upholstery 200 may include the base structure 206. The base structure 206 may also be referred to as a support, a structural member, and the like. The base structure 206 may support the cushion 202. The base structure 206 may support the cushion by bearing a weight of and/or holding up the cushion 202. The base structure 206 may be coupled to one or more structural members of the passenger seat 102. In embodiments, the base structure 206 may include one or more springs, although this is not intended to be limiting.

In embodiments, the upholstery 200 may include the cushion 202. The cushion 202 may include a shape or contour. The contour of the cushion 202 is designed to match the contour of a typical passenger. The cushion 202 may remain in the shape through the life of the cushion 202. In this regard, the cushion 202 may include a contour which is fixed. It is noted that the cushion 202 may experience some plastic deformations while remaining fixed at the contour. For example, the cushion 202 may experience plastic deformations due to age, heat, repeated elastic deformations, and the like.

In embodiments, the cushion 202 may include foam. The foam may include a material, such as, but not limited to a polyurethane (PU) foam. The foam may be cut and bonded into shape, molded into shape, and the like. In another embodiment, where there are multiple layers of foam, the multiple layers may be coupled together. For example, the multiple layers may be coupled with an adhesive, with fasteners, or the like. In embodiments where there are multiple layers of foam, the multiple layers may be fabricated from foam having the same or different densities. For example, the foam may be stacked, with the first layer on the bottom being constructed from a highest-density foam on the bottom (e.g., adjacent or on top of the base structure 206) and the succeeding layers being constructed of successively less dense foam.

In embodiments, the cushion 202 may include a fire blocker. The cushion 202 may include one or more layers of the fiber blocker. The fire blocker may include a flame retardant material property. Flame retardant may refer a property of resisting degradation when subject to a flame. The layers of the fiber blocker may be provided above, below, and/or interspersed with the layers of the foam.

In embodiments, the cushion 202 may include a stiffness. The stiffness of the cushion 202 may be defined by the foam and/or the fire blocker layers. The stiffness may be measured in indentation load deflection (ILD). Indentation load deflection (ILD) may indicate a number of pounds of pressure needed to indent a cushion by 25%. Indentation load deflection (ILD) may also be referred to as indentation force deflection (IFD) or as a compression profile. For example, the cushion 202 may include an Indentation Load Deflection (ILD) of between 20 and 80 pounds, although this is not intended to be limiting.

In embodiments, the upholstery 200 may include a dress cover 204. The dress cover 204 may be configured to fit over at least a portion of the cushion 202. For example, the dress cover 204 may be configured to wrap around or otherwise enclose the cushion 202. The dress cover 204 may then act as a protective skin to the cushion 202. The dress cover 204 may lie flat on the cushion 202. In this regard, the dress cover 204 may conform to the cushion 202. The cushion 202 and the base structure 206 may be at least partially covered or enclosed (e.g., contained within) by the dress cover 204. For example, the dress cover 204 may wrap around one or more edges, side surfaces, and/or bottom surface of the cushion 202 and/or the base structure 206 to secure the dress cover 204 to the cushion 202. For instance, the cushion 202 may be fully enclosed (e.g., contained within) by the dress cover 204, while at least a portion of the base structure 206 may be covered or enclosed by the dress cover 204. In addition, both the cushion 202 and the base structure 206 may be fully enclosed (e.g., contained within) by the dress cover 204. It is noted herein the wrap-around nature of the dress cover 204 may assist in keeping the dress cover 204 taut.

The dress cover 204 may contribute to the aesthetics of the passenger seat 102. For example, the dress cover 204 may include a color and/or pattern which contributes to the aesthetics. The color and pattern may be adjusted to achieve the desired aesthetic.

In another embodiment, the dress cover 204 is manufactured from one or more sections. In general, the dress cover 204 may be fabricated from 1, 2 . . . up to an N number of sections. Where there are multiple sections, each section has a section top surface length that forms a percentage of a cover top surface length of the dress cover 204. Where there are multiple sections, adjacent sections may be joined together. For example, the adjacent sections may be joined together via sewing, a fabric adhesive, or the like. For instance, adjacent sections may be joined together at one or more seams 208. Although a joining location is illustrated, it is noted herein the joining location is shown only for purposes of clarity and that the joining location may be hidden on the dress cover 204 (e.g., non-accessible when the dress cover 204 is installed on the cushion 202) for purposes of preventing access to the joining location, cleanliness of design, meeting aviation guidelines and/or standards, or the like.

In another embodiment, the one or more sections of the dress cover 204 may be fabricated from a same type and/or pattern of material or a different type and/or pattern of material. For example, at least some of the sections of the dress cover 204 may be fabricated from different types of material. By way of another example, all sections of the dress cover 204 may be fabricated from a different type and/or pattern of material. By way of another example, all sections of the dress cover 204 may be fabricated from a same type and/or pattern of material. The one or more sections of the dress cover 204 may include be fabricated from a yarn. The yarn may be an artificial muscle. The artificial muscle may be expandable and/or compressible (e.g., beyond the natural movement of the material structure or fabric weave).

In embodiments, the dress cover 204 may compress the cushion 202. The cushion 202 may be pre-compressed and then wrapped with the dress cover 204. The dress cover 204 may then compress the cushion 202 by flattening, squeezing, and/or pressing downwards on the cushion 202. The compression of the cushion 202 may increase the density of the foam in the cushion 202. The pre-compressed state of the cushion 202 may also increase the stiffness of the cushion 202. In this regard, the cushion 202 the increased density may correspond to the increased stiffness.

In embodiments, the dress cover 204 includes yarns 304 of artificial muscle. The dress cover 204 may compress the cushion 202 when no voltage is applied across yarns 304 of the dress cover 204. The yarns 304 of artificial muscle may be engaged to deform the dress cover 204. The deformation of the dress cover 204 may allow the cushion 202 to expand. The expansion of the cushion 202 may then change the stiffness of the cushion 202. For example, the expansion of the cushion 202 may reduce the density of the cushion and/or decrease the stiffness of the cushion 202. The expansion of the cushion 202 may decrease the stiffness. Thus, the stiffness of the cushion 202 may be actively adjusted by the dress cover 204.

Figure 2C:
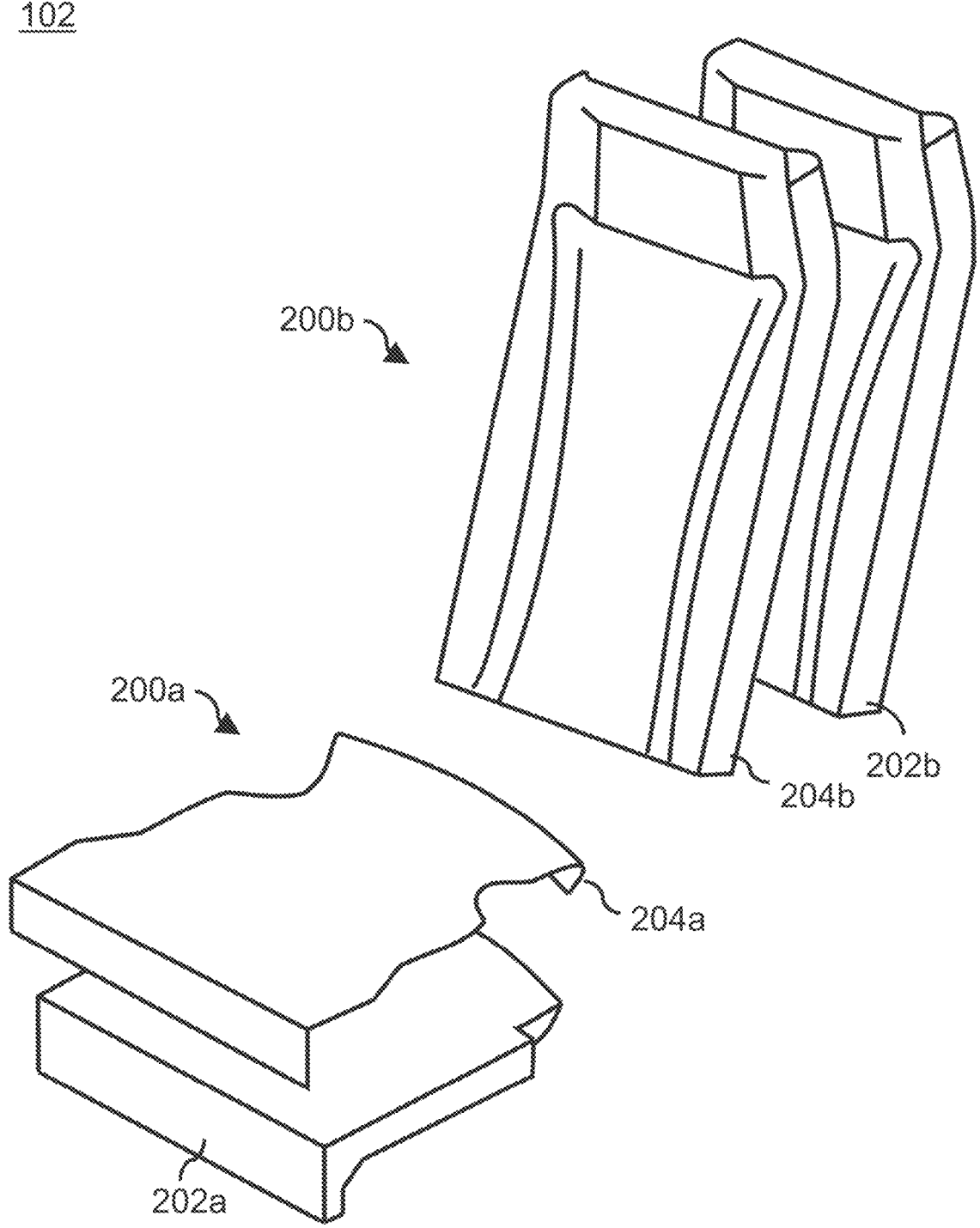
FIG. 2C depicts an exploded view of a passenger seat with a seat pan dress cover and a seat back dress cover, in accordance with one or more embodiments of the present disclosure.

Referring now in particular to FIG. 2C, an exploded view of the passenger seat 102 is described, in accordance with one or more embodiments of the present disclosure. The passenger seat 102 is depicted with two of the upholsteries 200. For example, the passenger seat 102 may include a seat pan upholstery 200a. The seat pan upholstery 200a is an upholstery of the seat pan 106. The seat pan upholstery 200a may include seat pan cushion 202a, a seat pan dress cover 204a, and a seat pan support structure (not depicted). By way of another example, the passenger seat 102 may include a seat back upholstery 200b. The seat back upholstery 200b is an upholstery of the seat back 104. The seat back upholstery 200b may include seat back cushion 202b, a seat back dress cover 204b, and a seat back support structure (not depicted).

Although the passenger seat 102 is described as including the upholsteries, this is not intended as a limitation of the present disclosure. It is contemplated that the upholstery 200 may be used with any of the seat back 104, seat pan 106, arm rest 108, head rest 110, the foot rest 112, ottoman, and the like. In this regard, the upholstery 200 may be a seat back upholstery, a seat pan upholstery, an arm rest upholstery, a head rest upholstery, a foot rest upholstery, an ottoman upholstery, and the like. In embodiments, one or more of the seat back 104, seat pan 106, arm rest 108, head rest 110, and/or the foot rest 112 includes the upholstery 200. It is further contemplated that a partition, a monument, an ottoman, and the like within the aircraft 100 may include the upholstery 200. In this regard, the upholstery 200 may be incorporated into one or more of the seat back 104, seat pan 106, arm rest 108, head rest 110, foot rest 112, the partition, the monument, or the ottoman of the aircraft 100. Furthermore, each of the various seat back 104, seat pan 106, arm rest 108, head rest 110, foot rest 112, partition, monument, and ottoman may include the upholstery 200.

Referring now to FIGS. 3A-3F, the dress cover 204 is described, in accordance with one or more embodiments of the present disclosure. In embodiments, the dress cover 204 includes a sheet 302 and yarns 304.

The sheet 302 may include a material. For example, the material of the sheet 302 may include, but is not limited to, a fabric (e.g., a woven fabric), a leather, a synthetic material, and the like.

In embodiments, the dress cover 204 includes the yarns 304. The yarns 304 may be stitched into, woven with, and/or integrated into the sheet 302. The yarns 304 may include yarn 304a and yarn 304b. The yarn 304a and the yarn 304b are woven together. The yarn 304a and the yarn 304b may be carried back and forth along the width and length and woven together. The yarn 304a and the yarn 304b may then be interlaced in a specific order. For example, the yarn 304a may cross over the yarn 304b at one or more positions. The positions of the yarn 304a crossing over the yarn 304b may define a weave pattern, as will be described further herein. The yarn 304a may also be disposed orthogonal relative to the yarn 304b.

In embodiments, the yarn 304a is in warp. Warp may refer to a yarn which is lengthwise, longitudinal, or vertically relative to the dress cover 204. In this regard, the yarn 304a may be referred to as a warp yarn. The yarn 304a may be carried back and forth along a length of the dress cover 204. The yarn 304a may be a continuous yarn. In this regard, the yarn 304a may be a continuous yarn by being iteratively carried along the length, folded over, carried back along the length in parallel to the first length, and then folded over.

In embodiments, the yarn 304b is in weft. Weft may refer to a yarn which is transverse or horizontal relative to the dress cover 204. The yarn 304b may be referred to as a weft yarn. The yarn 304b may be carried back and forth along a width of the dress cover 204. The yarn 304b may be a continuous yarn. In this regard, the yarn 304b may be a continuous yarn by being iteratively carried along the width, folded over, carried back along the width in parallel to the first width, and then folded over.

The dress cover 204 may include a warp density. The warp density may refer to the number of lengths of the yarn 304a per a unit square (e.g., number of the lengths per inch). The dress cover 204 may also include a weft density. The weft density may refer to the number of lengths of the yarn 304b per a unit square (e.g., number of the lengths per inch). The dress cover 204 may include a mesh density. The mesh density may be defined by the warp density and the weft density (e.g., defined as a ratio of the warp density to the weft density, defined as a ratio of the weft density to the warp density). The dress cover 204 may include any warp density, weft density, and mesh density, such that the depiction of the yarn 304a and the yarn 304b is not intended to be limiting.

In embodiments, the yarns 304 may be an active muscle. The active muscle may actuate when a stimulus is applied. The stimulus applied to the active muscle may include, but is not limited to a voltage differential applied across the yarns 304, heating the yarns 304, and the like. The term voltage differential may also be referred to as an electric potential difference or the like. The voltage differential may indicate a first end of the yarn has a voltage which is higher than a second end of the yarn. The voltage differential may then induce a current through the yarns 304. The yarns 304 may receive the voltage differential by the voltage differential being applied across the yarns 304. It is contemplated that the artificial muscles may include a twisted and coiled polymeric (TCP) actuator, a shape memory alloy, and the like. In embodiments, the active muscle may include a reversible actuation cycle. The reversible actuation cycle may include actuating the yarns 304 by changing the length and then returning the yarns 304 to the original length. The original length may refer to the length of the yarns 304 immediately prior to receiving the voltage differential.

The yarns 304 may change in length when the voltage differential is applied to the yarns 304. The change in length of the artificial muscles may refer to a length of the yarns 304 being reduced or increased. The change in length may refer to contraction (e.g., reducing the length) or expansion (e.g., increasing the length). The voltage differential may induce internal stresses in the yarns 304. The internal stress may cause the change in length. The voltage differential may be applied across the yarn 304a and/or the yarn 304b. The voltage differential may cause the yarn 304a and/or the yarn 304b to change in length.

The changes in length of the yarns 304 may cause the dress cover 204 to bulge. The bulging of the dress cover 204 may refer to swelling outward or expansion of the dress cover 204 away from the cushion 202 and/or away from the base structure 206. The yarns 304 may act as a spring stiffness by deforming elastically under load. The bulging of the dress cover 204 may allow the cushion 202 to expand thereby changing the stiffness of the cushion 202. The expansion of the cushion 202 may also allow the cushion 202 to contour to a portion of a passenger sitting on the passenger seat 102.

In embodiments, the yarns 304 may return to the original length when the voltage differential is removed. The yarns 304 may return to the original length to reduce the internal stresses. The return of the yarns 304 to the original length may cause the dress cover 204 to return to a flat surface. The flat surface may be desirable for aesthetic purposes.

In embodiments, the dress cover 204 may bulge convexly. The convex bulging of the dress cover 204 may be based on one or more factors, such as, but not limited to, warp density, weft density, mesh density, yarn length, weave pattern, the voltage differential, and the like. The factors may be controlled to achieve a desired stiffness for the cushion 202. As may be understood, the warp density, weft density, mesh density, yarn length, and weave pattern are not limited to the layout depicted. The layout may be adjusted based on the width and length of the cushion 202.

The convex bulging of the dress cover 204 may be defined by a surface of the dress cover 204. It is contemplated that the dress cover 204 may convexly bulge into a number of surfaces, such as, but not limited to, convex parabolic cylinders, hyperbolic paraboloids, a saddle surface, a crossed trough surface, and the like. In some instances, the convex bulging of the surfaces of the dress cover 204 may be beneficial to conform to a surface of a passenger. For example, the surface of the dress cover 204 may be beneficial to conform to a seat, a back, or the like of the passenger sitting on the upholstery 200.

Figure 3A:
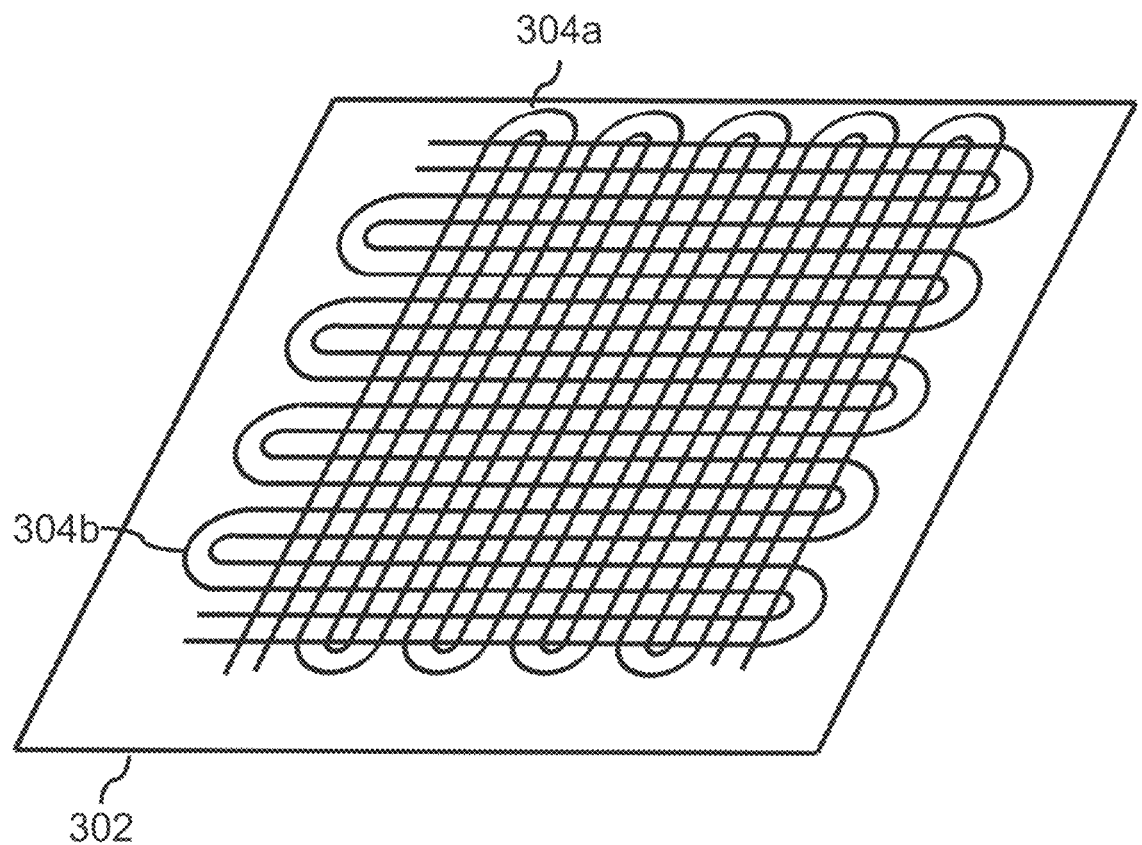
FIG. 3A depicts a perspective view of a dress cover with yarns in warp and weft, in accordance with one or more embodiments of the present disclosure.
Figure 3B:
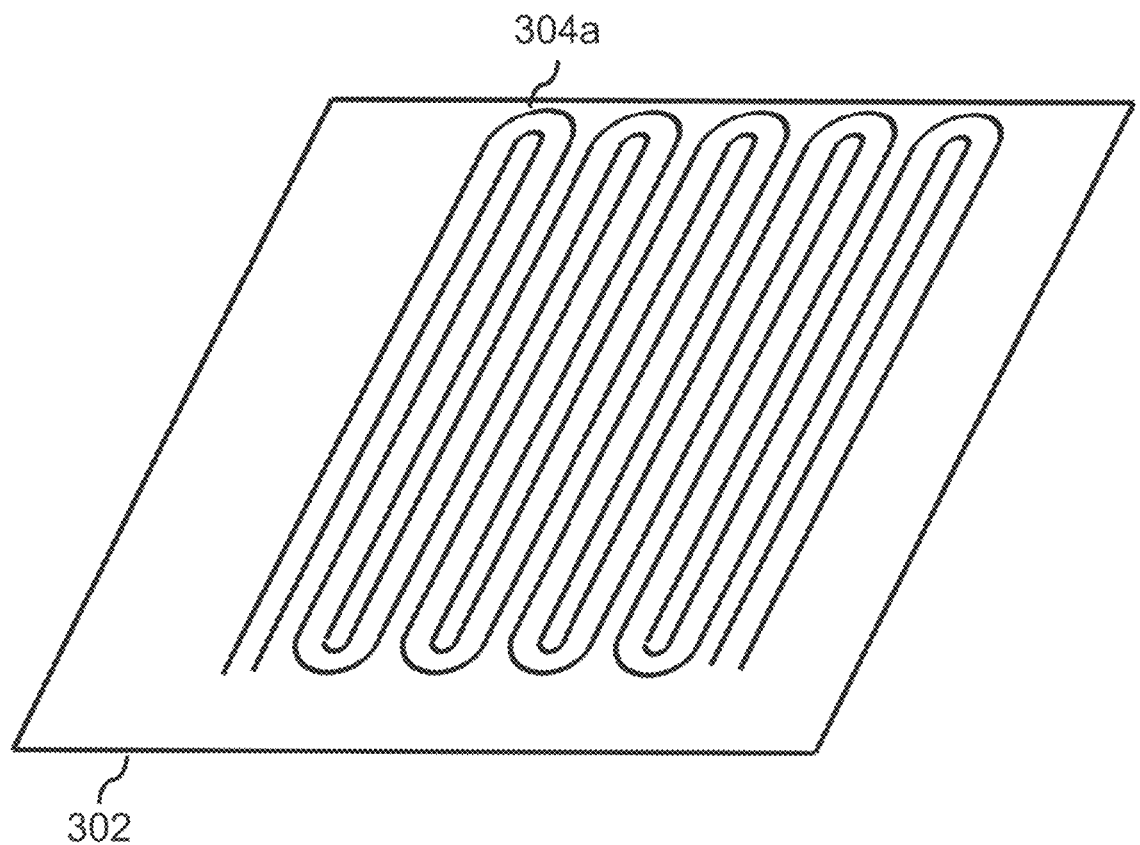
FIG. 3B depicts a perspective view of a dress cover with a yarn in warp, in accordance with one or more embodiments of the present disclosure.
Figure 3C:
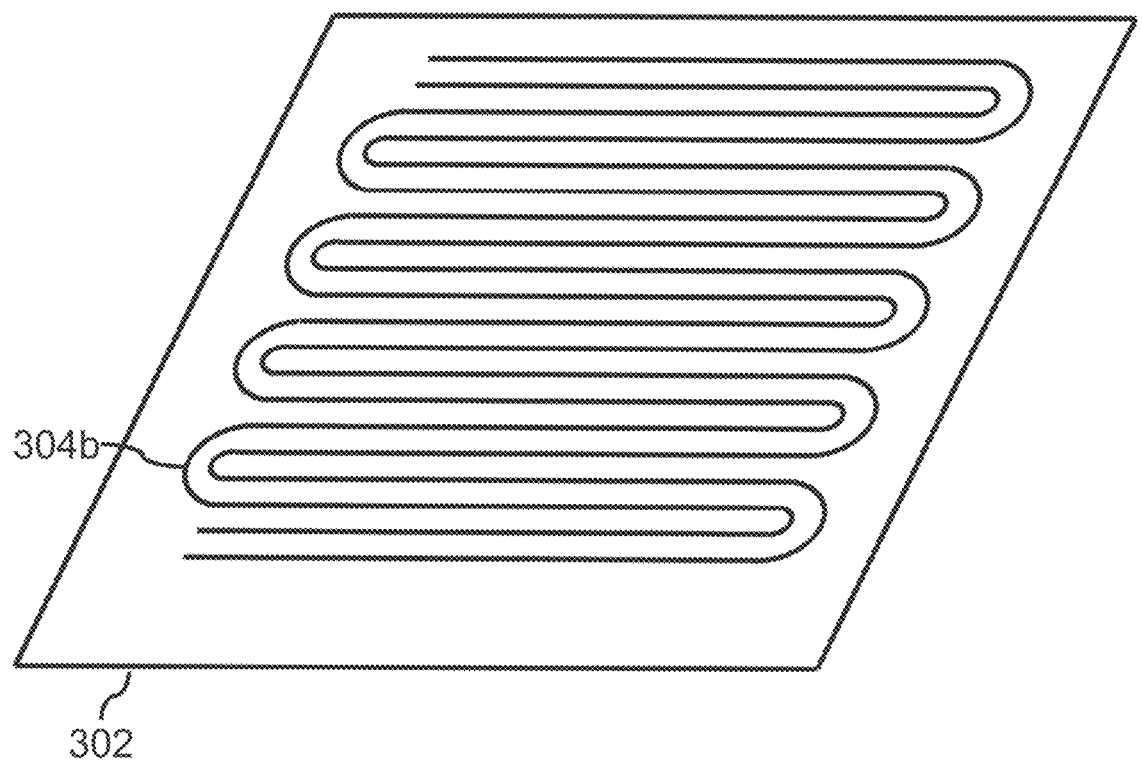
FIG. 3C depicts a perspective view of a dress cover with a yarn in weft, in accordance with one or more embodiments of the present disclosure.
Figure 3D:
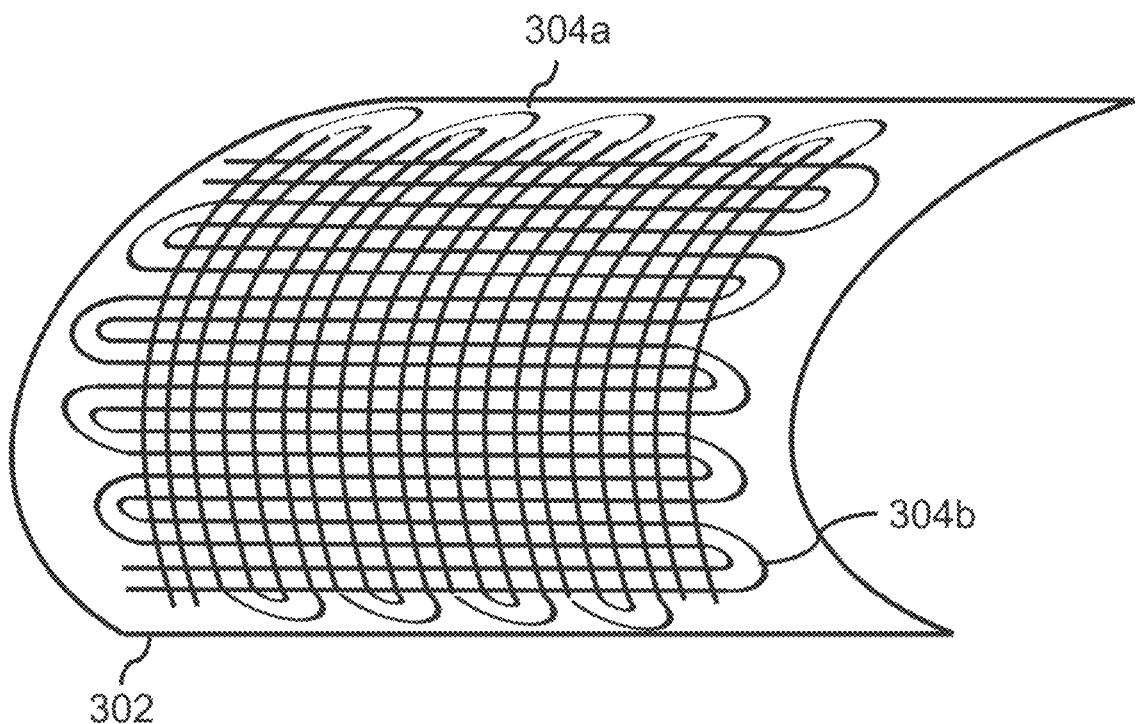
FIG. 3D depicts a perspective view of a dress cover with yarns in warp and weft with the yarn in warp causing the dress cover to bulge, in accordance with one or more embodiments of the present disclosure.

Referring now to FIG. 3D, the voltage differential is applied across the yarn 304a and the voltage differential is not applied across the yarn 304b. The yarn 304a is contracted due to the voltage differential while the yarn 304b remains the original length. The lengths of the yarns 304 causes the dress cover 204 to bulge. The dress cover 204 bulges convexly with a surface of a parabolic cylinder. The surface is non-uniform along the length of the yarn 304a and is uniform along the length of the yarn 304b. A minimum height of the surface is at the turns or ends of the yarn 304a. A maximum height of the surface is at a midpoint of the length of the yarn 304a.

Figure 3E:
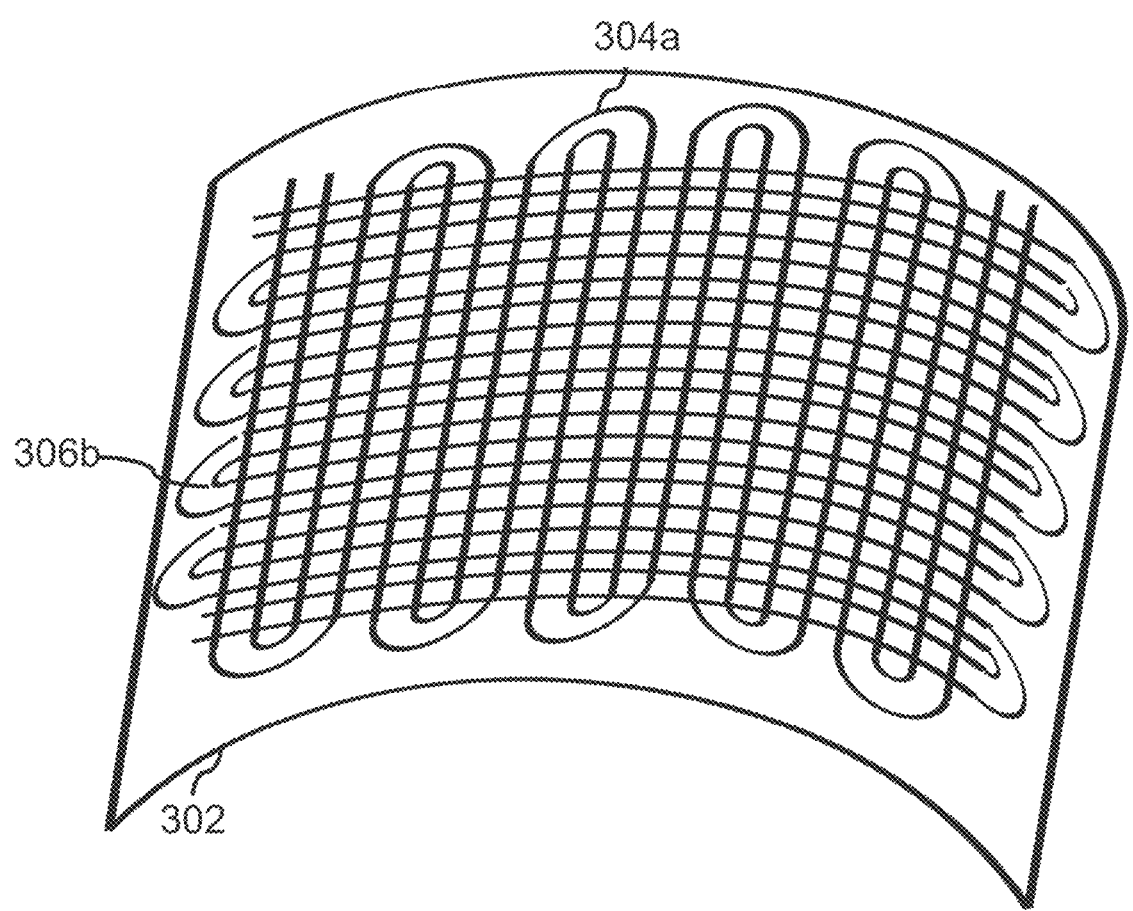
FIG. 3E depicts a perspective view of a dress cover with yarns in warp and weft with the yarn in weft causing the dress cover to bulge, in accordance with one or more embodiments of the present disclosure.

Referring now to FIG. 3E, the voltage differential is not applied across the yarn 304a and the voltage differential is applied across the yarn 304b. The yarn 304a remains the original length while the yarn 304b is contracted due to the voltage differential. The lengths of the yarns 304 causes the dress cover 204 to bulge. The dress cover 204 is bulges convexly with a surface of a parabolic cylinder. The surface is uniform along the length of the yarn 304a and is non-uniform along the length of the yarn 304b. A minimum height of the surface is at the turns or ends of the yarn 304b. A maximum height of the surface is at a midpoint of the length of the yarn 304b.

Figure 3F:
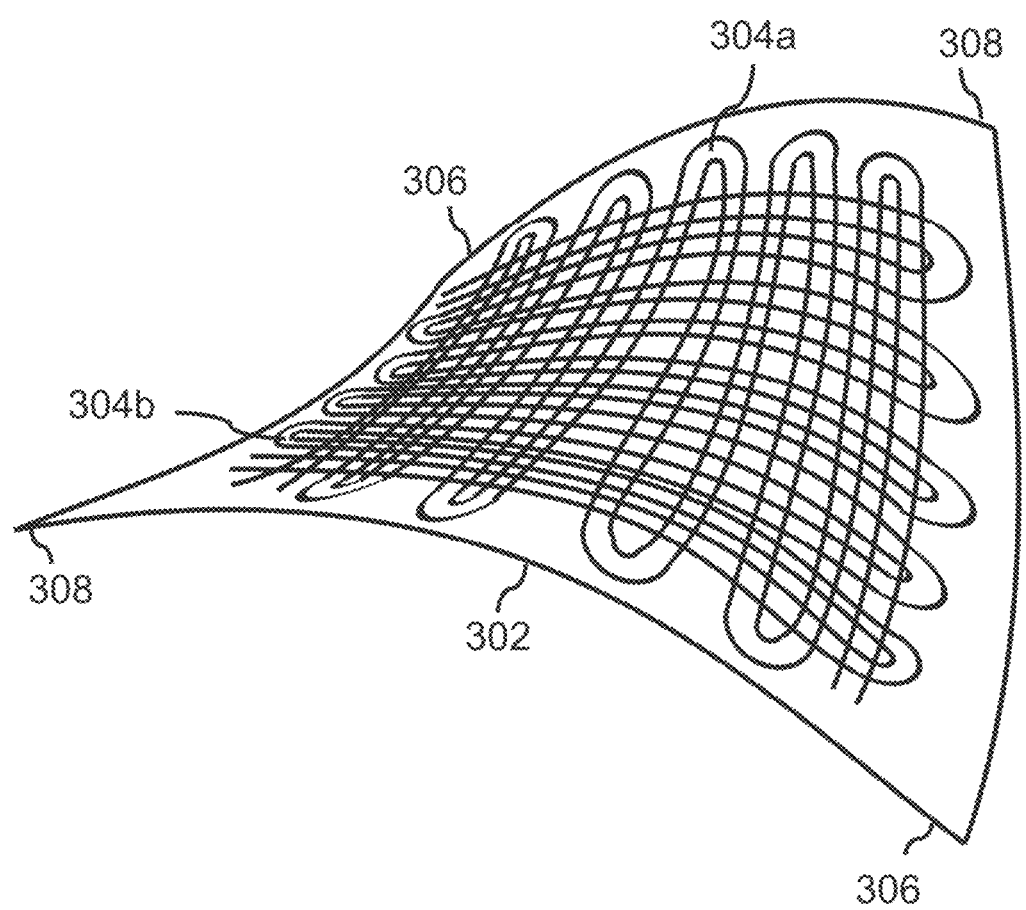
FIG. 3F depicts a perspective view of a dress cover with yarns in warp and weft with the yarns in warp and weft causing the dress cover to bulge, in accordance with one or more embodiments of the present disclosure.

Referring now to FIG. 3F, the voltage differential is applied across the yarn 304a and the voltage differential is applied across the yarn 304b. The yarn 304a and the yarn 304b are each contracted due to the voltage differential. The lengths of the yarns 304 causes the dress cover 204 to bulge. The dress cover 204 bulges convexly with a surface of a hyperbolic paraboloid. The surface is non-uniform along the length of the yarn 304a and is non-uniform along the length of the yarn 304b. A minimum height of the surface is at a first set of opposing corners 306 of the dress cover 204. A maximum height of the surface is at a second set of opposing corners 308 of the dress cover 204. The surface may include a saddle point at a middle of the dress cover 204.

Figure 4:
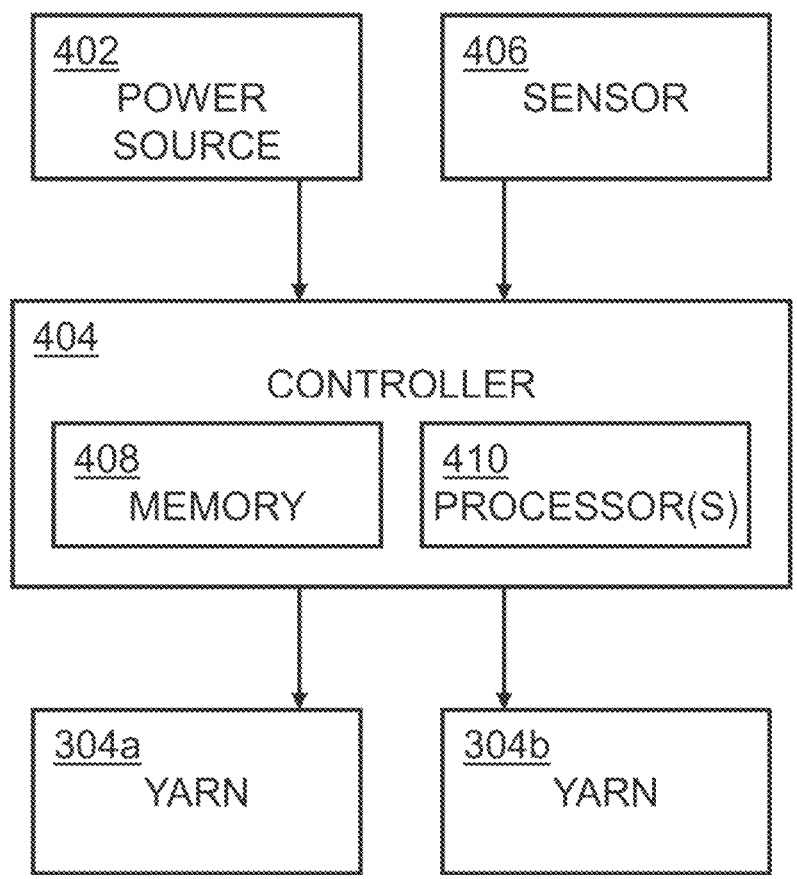
FIG. 4 depicts a block diagram of a control system for yarns of a dress cover, in accordance with one or more embodiments of the present disclosure.

Referring now to FIG. 4, a control system 400 is described, in accordance with one or more embodiments of the present disclosure. The passenger seat 102 and/or the upholstery 200 may include the control system 400 and/or components of the control system 400. The control system 400 may include a power source 402, a controller 404, the yarns 304, a sensor 406, and the like.

The controller 404 may receive power from the power source 402. The controller 404 may then provide a voltage differential across the yarn 304a and/or the yarn 304b. In embodiments, the controller 404 may control the actuation of the yarns 304 of the dress cover 204. The controller 404 may control the voltage differential to control the change in length of the yarns, the bulging of the dress cover 204, and similarly the stiffness of the cushion 202. The controller 404 may apply a first voltage differential across the yarn 304a and a second voltage differential across the yarn 304b. In embodiments, the controller 404 may adjust the first voltage differential and the second voltage differential to adjust the bulging of the dress cover 204 and the stiffness of the cushion 202. The convex bulging of the surface of the dress cover 204 may be controlled by controlling the voltage differential to the yarn 304a and the yarn 304b.

In embodiments, the controller 404 may independently control the voltage differential across the yarn 304a and the voltage differential across the yarn 304b. The yarn 304a and the yarn 304b may receive different voltages. The voltages of the yarn 304a and the yarn 304b may then be varied. The upholstery 200 may achieve complex deformations by varying the voltage differentials.

In embodiments, the sensor 406 may generate data. The data may indicate one or more characteristics of a passenger sitting on the upholstery 200. The controller 404 may adjust the first voltage differential and the second voltage differential based on the data from the weight sensor.

In embodiments, the sensor 406 may include a weight sensor. The weight sensor may generate data regarding the weight of the passenger sitting on the upholstery 200. The controller 404 may adjust the voltage differential based on the data regarding the weight of the passenger. In this regard, the cushion 202 may include a stiffness which is adjusted based on the weight of the passenger. The stiffness may be adjusted to provide an improved pressure distribution or increase comfort. The stiffness and/or the contour of the cushion 202 may then be controlled and adapted to each passenger.

In embodiments, the sensor 406 may include a seat position sensor. The data from the sensor 406 may indicate a position of the passenger seat 102. The controller 404 may adjust the voltage differential when the position of the passenger seat 102 is changed based on the data from the sensor 406. For example, the upholstery 200 may be the seat pan upholstery 200a. The controller 404 may adjust the voltage differential to increase the stiffness of the cushion 202a when the passenger seat 102 is in an upright position and adjust the voltage differential to decrease the stiffness of the cushion 202a when the passenger seat 102 is in a lie-flat position.

In embodiments, the controller 404 is configured to implement a massage feature in the upholstery 200. The controller 404 may adjust the voltage differentials applied across the yarn 304a and/or the yarn 304b causing the dress cover 204 to bulge and contract. For example, the controller 404 may alternate voltage pulses across the yarns 304. The bulging and contraction of the dress cover 204 may massage a passenger sitting on the upholstery.

In embodiments, the controller 404 include memory 408. A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. For instance, the program instructions may cause the processors to adjust the voltage differential.

In embodiments, the controller 404 includes one or more processors 410. The processors may include any processing unit known in the art. For example, the processors may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

Figure 5:
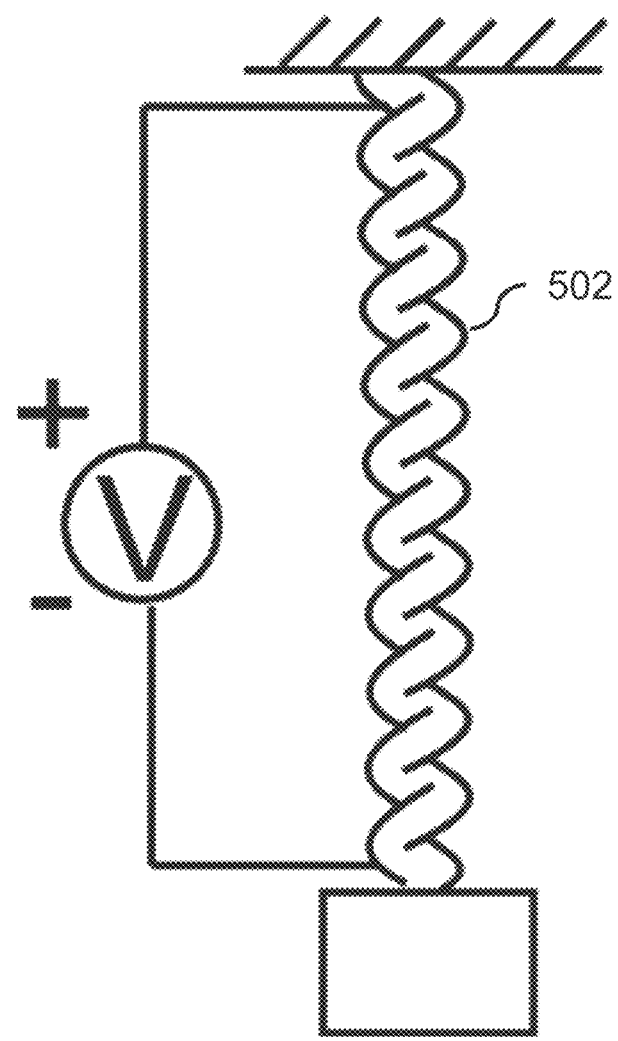
FIG. 5 depicts a simplified view of a twisted and coiled polymeric (TCP) actuator with a voltage differential, in accordance with one or more embodiments of the present disclosure.

Referring now to FIG. 5, a twisted and coiled polymeric (TCP) actuator 500 is described, in accordance with one or more embodiments of the present disclosure. In embodiments, the yarns 304 may each be the TCP actuator 500. The TCP actuator 500 may change in length when a voltage differential is applied across the yarns 304. The applied voltage creates a twisting and coiling of the TCP actuator 500. The twisting and coiling of the TCP actuator 500 may create a potential force inside the yarns 304 causing the yarns 304 to contract along the length of the yarns 304. The yarns 304 may then return to the original length when the voltage differential is removed. When the voltage is removed, the yarns 304 may untwist and uncoil causing the yarns 304 to expand to the original length.

The use of the TCP actuator 500 embedded in the dress cover 204 may allow the dress cover 204 to bulge using low voltages. For example, the TCP actuator 500 may activated with small voltage range of 9 volts to 11 volts. The TCP actuator 500 may include a deflection on the order of centimeters. The deflection may vary with respect to length of the yarn used and applied voltage distance.

In embodiments, the TCP actuator 500 may include fibers 502. The fibers 502 may also be referred to as threads. For example, the TCP actuator 500 is depicted as being a one fiber or in a one ply configuration. It is further contemplated the TCP actuator 500 may be one ply, two ply, or multiple ply. It is contemplated that including multiple of the fibers 502 may offer a higher potential force than single fiber. The fibers 502 may be preloaded and coiled to form the TCP actuator 500. The behavior of the TCP actuator 500 may be govern by the following equation:

$$Tc = \frac{2\sqrt{2\sigma E}}{\pi DG'}$$

Tc is the critical twist torque required for coiling (Turns/m), G' is the shear modulus of fiber material (N/m2), D fiber of circular diameter (m), E is the young's modulus of the material. (N/m2).

In embodiments, the fibers 502 may include a material. For example, the fibers may include, but are not limited to, a nylon material. For instance, the nylon material may include nylon 6, nylon 6/6, and the like.

Figure 6A:
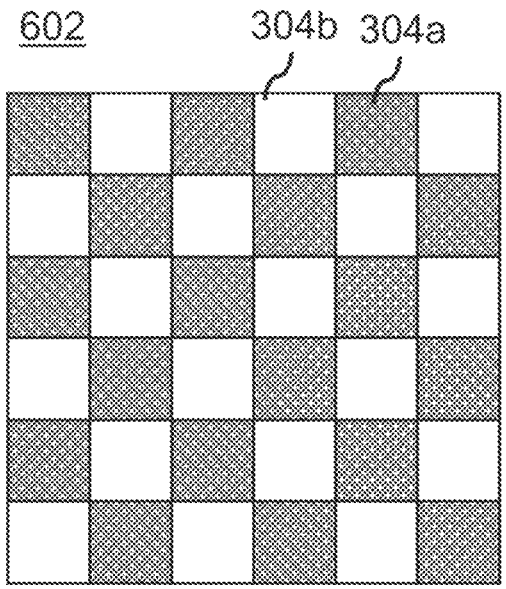
FIGS. 6A-6C depict weave patterns, in accordance with one or more embodiments of the present disclosure.
Figure 6B:
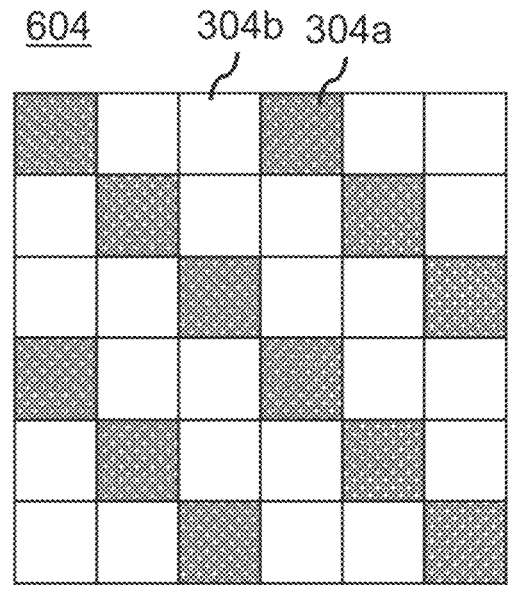
Figure 6C:
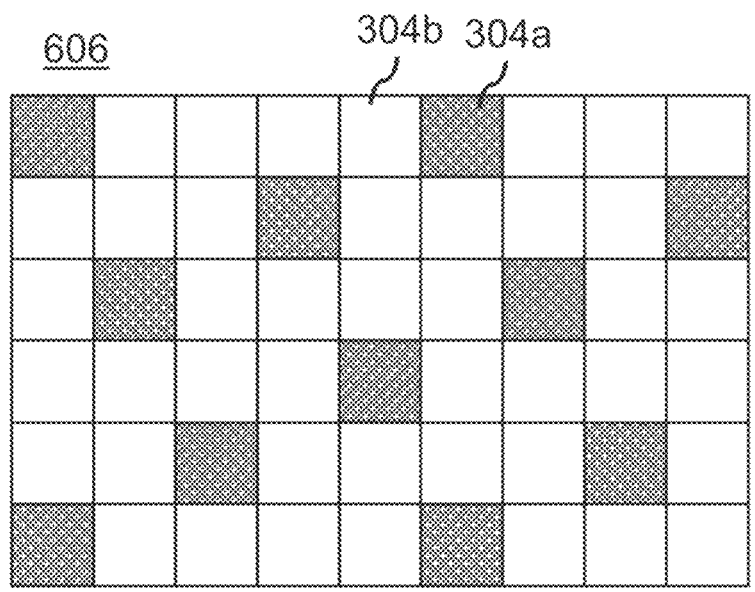

Referring now to FIGS. 6A-6C, the yarn 304a and the yarn 304b may be woven together in a weave pattern. The weave pattern may be a geometric pattern repeating across the dress cover 204. The weave pattern may indicate the pattern in which the warp and weft yarns are interlaced. It is contemplated that the weave pattern may be any weave patterns from the textile industry, such as, but not limited to, a plain weave pattern 602, a twill weave pattern 604, a satin weave pattern 606, a jacquard weave pattern, a velvet weave pattern, and the like. It is contemplated the weave pattern may control the bulging of the dress cover 204.

Figure 7A:
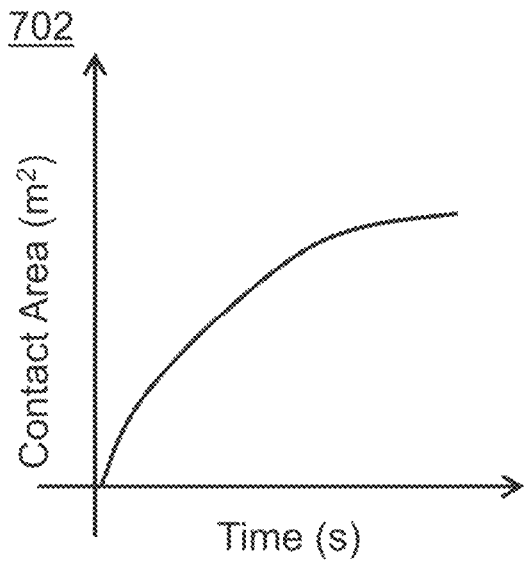
FIG. 7A-7C depict graphs, in accordance with one or more embodiments of the present disclosure.
Figure 7B:
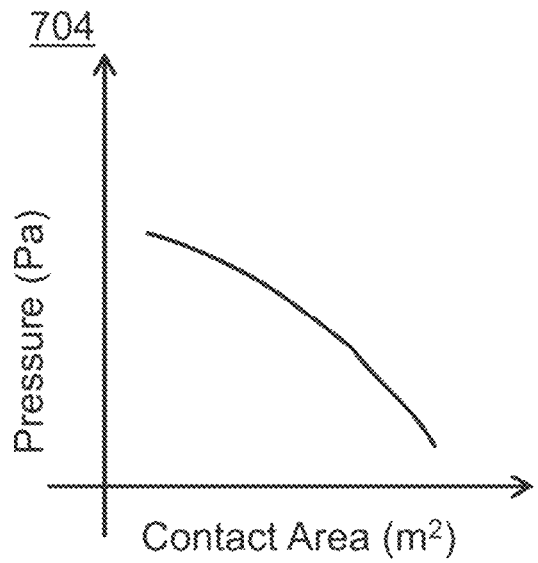
Figure 7C:
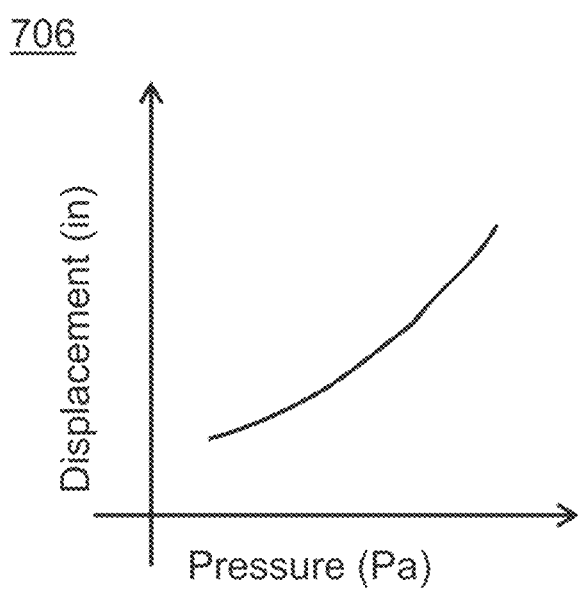

Referring now to FIGS. 7A-7C, graphs 702-706 are described, in accordance with one or more embodiments of the present embodiment. The graphs 702-706 depict one or more characteristics of the upholstery 200.

The graph 702 depicts time as a function of contact area. The contact area may indicate the area of the upholstery 200 in contact with a passenger sitting on the upholstery 200. The contact area may saturate over time. In this regard, the bulging of the dress cover 204 may take several minutes (e.g., up to thirty minutes or more).

The graph 704 depicts the pressure as a function of contact area. The pressure may decrease with an increase in the contact area. An increased contact area is desirable to reduce the pressure felt by the passenger. As the contact area increases due to fabric morphing, the weight is distributed more uniformly and the pressure is reduced. The passenger may feel more comfortable when the pressure is reduced. For example, high level of surface pressure can constrict blood vessels in underlying tissues, restricting blood flow, which the passenger experiences as discomfort.

The graph 706 depicts displacement as a function of pressure. The displacement may increase with the pressure. The pressure may be a function of the weight of the passenger and the contact area between the cushion and the passenger. The displacement may indicate the displacement of the cushion 202 and/or the dress cover 204.

Figure 8:
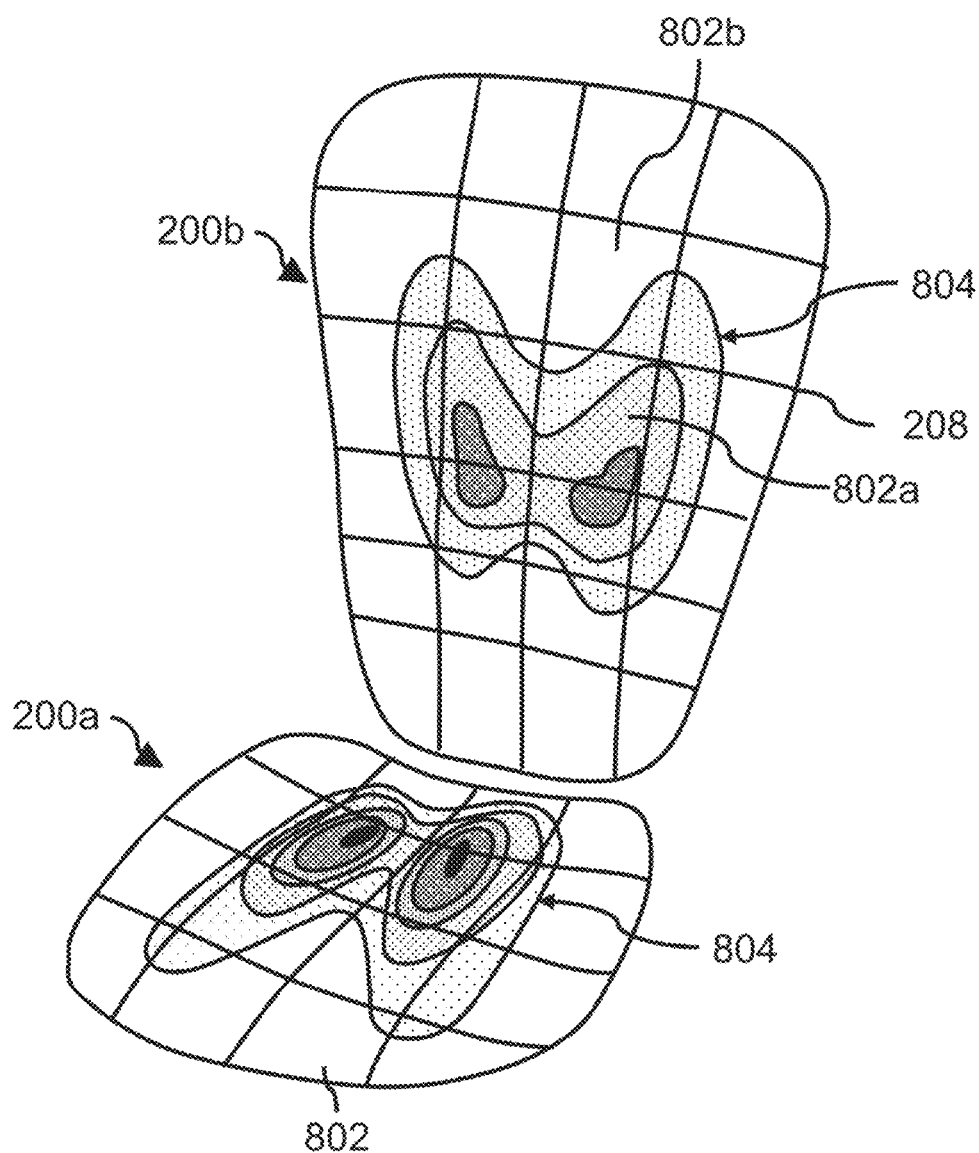
FIG. 8 depicts a perspective view of a passenger seat with a seat pan dress cover and a seat back dress cover including sections with mesh densities to accommodate expected pressure distributions, in accordance with one or more embodiments of the present disclosure.

Referring now to FIG. 8, a passenger seat 800 is described, in accordance with one or more embodiments of the present disclosure. The discussion of the passenger seat 800 is incorporated herein by reference in the entirety as to the passenger seat 800. The passenger seat 800 may include the dress cover 204. As depicted, the passenger seat 800 includes the seat pan dress cover 204a and the seat back dress cover 204b, although this is not intended to be limiting.

In embodiments, the dress cover 204 may include one or more sections 802. The sections 802 may be rectangular shaped sections, although this is not intended to be limiting. The sections 802 may be joined with adjacent sections by the seams 208.

In embodiments, the upholstery 200 may include an expected pressure distribution 804. The expected pressure distribution may be based on the proportions and weight of an average passenger. The expected pressure distribution 804 may be extracted from pressure mapping data.

In embodiments, the mesh density may vary across the dress cover 204. The sections 802 may include different mesh densities of the yarn 304a and the yarn 304b to vary the mesh density. A higher mesh density may allow the dress cover to bulge with a higher curvature. The higher curvature may then increase the stiffness. For example, the dress cover 204 may include a higher mesh density in sections 802 expected to have a high-pressure distribution or expected to bear a substantial portion of weight from a passenger. The use of the higher mesh density may enable sufficient stiffness in the higher-pressure sections. Similarly, a lower mesh density of the yarns 304 may be located in a lower pressure section of the cushion. The use of the lower mesh density of may prevent over stiffening in the lower pressure regions. Thus, the cushion may be optimized to achieve a desired indentation load deflection across the upholstery 200. In embodiments, the mesh density of the yarns 304 may be determined based on the pressure mapping data for each type of cushion.

For example, the sections 802 may include a section 802a and a section 802b. The section 802a is depicted as being adjacent to the section 802b, although this is not intended to be limiting. The section 802a may include a first mesh density and the section 802b may include a second mesh density. The first mesh density may be higher than the second mesh density. The relative arrangements of the section 802a and the section 802b together with the section 802a having a higher mesh density than the section 802b, may allow the seat back dress cover 204b to achieve relatively more support for the lower back of the passenger, together with less support for the upper back of the passenger.

Similarly, the relative arrangements and mesh densities of the sections 802 on the seat pan dress cover 204a may allow the seat pan dress cover 204a to achieve relatively more support for the tailbone of the passenger, together with less support for the femur of the passenger.

Referring generally again to FIGS. 1A-8. It is noted that where the passenger seat 102 is installed within the aircraft 100, the passenger seat 102 may be configured in accordance with aviation guidelines and/or standards put forth by, but not limited to: the Federal Aviation Administration (FAA), the European Aviation Safety Agency (EASA), or any other flight certification agency or organization; the American National Standards Institute (ANSI) or any other standards setting organization or company; and the like.

Although much of the present disclosure is directed to the passenger seat 102 being installed within the aircraft 100 or aircraft cabin, it is noted herein the passenger seat 102 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An upholstery comprising:
   a cushion; and
   a dress cover; wherein the dress cover encloses at least a portion of the cushion; wherein the dress cover comprises a first yarn and a second yarn; wherein the first yarn and the second yarn are woven together; wherein the first yarn is in warp; wherein the second yarn is in weft;
   wherein the dress cover compresses the cushion when there is no voltage applied across the first yarn and the second yarn; wherein the first yarn and the second yarn are each configured to change in length upon receiving a voltage differential; wherein the change in length of the first yarn and the second yarn causes the dress cover to bulge; wherein the bulge of the dress cover allows the cushion to expand thereby changing a stiffness of the cushion; wherein the first yarn and the second yarn are each configured to return to an original length when the voltage differential is removed.

2. The upholstery of claim 1, comprising a base structure; wherein the base structure supports the cushion.

3. The upholstery of claim 1, wherein the cushion comprises one or more layers of a foam.

4. The upholstery of claim 1, wherein the dress cover comprises a fabric; wherein the first yarn and the second yarn are stitched into the fabric.

5. The upholstery of claim 1, wherein the dress cover bulges convexly.

6. The upholstery of claim 1, comprising a controller configured to apply a first voltage differential across the first yarn and apply a second voltage differential across the second yarn.

7. The upholstery of claim 6, wherein the controller is configured to adjust the first voltage differential and the second voltage differential to adjust the bulge of the dress cover and the stiffness of the cushion.

8. The upholstery of claim 7, comprising a sensor; wherein the controller is configured to adjust the first voltage differential and the second voltage differential based on data from the sensor.

9. The upholstery of claim 7, wherein the controller is configured to independently adjust the first voltage differential and the second voltage differential to independently adjust the change in length of the first yarn and the second yarn.

10. The upholstery of claim 1, wherein the first yarn and the second yarn each comprise a twisted and coiled polymeric (TCP) actuator.

11. The upholstery of claim 10, wherein the TCP actuator comprises one or more fibers.

12. The upholstery of claim 11, wherein the one or more fibers comprise a nylon material.

13. The upholstery of claim 1, wherein the first yarn and the second yarn are woven together in a weave pattern.

14. The upholstery of claim 13, wherein the weave pattern comprises one of a plain weave, a twill weave, or a satin weave.

15. The upholstery of claim 1, wherein the first yarn and the second yarn are continuous.

16. The upholstery of claim 1, wherein the first yarn comprises a warp density; wherein the second yarn comprises a weft density; wherein the warp density and the weft density define a mesh density of the dress cover.

17. The upholstery of claim 16, wherein the mesh density is a first mesh density; wherein the dress cover comprises the first mesh density in a first section of the dress cover; wherein the dress cover comprises a second mesh density in a second section of the dress cover; wherein the first mesh density is higher than the second mesh density.

18. A passenger seat comprising:
a seat back;
a seat pan; and
an upholstery comprising:
a cushion; and
a dress cover; wherein the dress cover encloses at least a portion of the cushion; wherein the dress cover comprises a first yarn and a second yarn; wherein the first yarn and the second yarn are woven together; wherein the first yarn is in warp; wherein the second yarn is in weft;
wherein the dress cover compresses the cushion when there is no voltage applied across the first yarn and the second yarn; wherein the first yarn and the second yarn are each configured to change in length upon receiving a voltage differential; wherein the change in length of the first yarn and the second yarn causes the dress cover to bulge; wherein the bulge of the dress cover allows the cushion to expand thereby changing a stiffness of the cushion; wherein the first yarn and the second yarn are each configured to return to an original length when the voltage differential is removed.

19. The passenger seat of claim 18, wherein the upholstery is a seat pan upholstery of the seat pan.

20. The passenger seat of claim 18, wherein the upholstery is a seat back upholstery of the seat back.

* * * * *